(12) United States Patent
Zhang et al.

(10) Patent No.: US 10,469,205 B2
(45) Date of Patent: Nov. 5, 2019

(54) APPLICATION-BASED MULTI-BAND TRANSMISSION

(71) Applicant: T-Mobile USA, Inc., Bellevue, WA (US)

(72) Inventors: Hongliang Zhang, Samammish, WA (US); Mark McDiarmid, Seattle, WA (US); Adeel Ahmad, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 241 days.

(21) Appl. No.: 14/546,918

(22) Filed: Nov. 18, 2014

(65) Prior Publication Data

US 2015/0071239 A1 Mar. 12, 2015

Related U.S. Application Data

(63) Continuation-in-part of application No. 14/076,548, filed on Nov. 11, 2013, now Pat. No. 8,958,751,
(Continued)

(51) Int. Cl.
*H04L 1/04* (2006.01)
*H04W 72/10* (2009.01)
(Continued)

(52) U.S. Cl.
CPC .............. *H04L 1/04* (2013.01); *H04L 1/0006* (2013.01); *H04W 72/10* (2013.01); *H04L 5/003* (2013.01); *H04L 5/006* (2013.01)

(58) Field of Classification Search
CPC ......... H04L 1/04; H04L 1/0006; H04L 5/006; H04L 5/003; H04W 72/10
See application file for complete search history.

(56) References Cited

U.S. PATENT DOCUMENTS

| 5,818,820 A | 10/1998 | Anderson et al. |
| 6,072,994 A | 6/2000 | Phillips et al. |

(Continued)

FOREIGN PATENT DOCUMENTS

| CN | 1334664 A | 2/2002 |
| JP | 2003-086233 | 3/2003 |

(Continued)

OTHER PUBLICATIONS

PCT Search Report and Written Opinion dated Mar. 31, 2016, for PCT applciation No. PCT/US2015/061057, 15 pages.
(Continued)

*Primary Examiner* — Christopher P Grey
(74) *Attorney, Agent, or Firm* — Lee & Hayes, P.C.

(57) ABSTRACT

Described herein is a radio access provider configured to communicate with wireless access devices over frequency bands. The radio access provider receives service priorities associated with active applications of the wireless communication devices. Based at least in part on the service priorities, the radio access provider selects blocks or channels from one or more of the frequency bands for a radio communication link for each of at least a subset of the wireless communication devices. The selecting may include selecting block or channels from multiple ones of the frequency bands for the radio communication link for at least one of the subset of the wireless communication devices. The selecting may also be based at least in part on signal quality metrics for the frequency bands, cross-correlations of the frequency bands, or power capacities of the wireless communication devices.

22 Claims, 8 Drawing Sheets

Related U.S. Application Data which is a continuation of application No. 13/540,530, filed on Jul. 2, 2012, now Pat. No. 8,583,047, which is a continuation of application No. 11/996,928, filed as application No. PCT/US2006/028334 on Jul. 21, 2006, now Pat. No. 8,213,867.

(60) Provisional application No. 60/702,883, filed on Jul. 27, 2005.

(51) Int. Cl.
*H04L 5/00* (2006.01)
*H04L 1/00* (2006.01)

(56) References Cited

U.S. PATENT DOCUMENTS

| | | | | |
|---|---|---|---|---|
| 6,466,557 | B1* | 10/2002 | Doi | H04J 3/1682 |
| | | | | 370/332 |
| 6,477,370 | B1 | 11/2002 | Sigler et al. | |
| 8,255,281 | B2 | 8/2012 | Benson et al. | |
| 9,332,547 | B1* | 5/2016 | Ghavami | H04W 72/0453 |
| 2003/0043773 | A1 | 3/2003 | Chang | |
| 2003/0212598 | A1 | 11/2003 | Raman et al. | |
| 2004/0092285 | A1 | 5/2004 | Kodim | |
| 2004/0111249 | A1 | 6/2004 | Narahara | |
| 2004/0203815 | A1* | 10/2004 | Shoemake | H04W 72/02 |
| | | | | 455/450 |
| 2004/0204035 | A1 | 10/2004 | Raghuram et al. | |
| 2005/0020243 | A1 | 1/2005 | Benco et al. | |
| 2005/0174963 | A1* | 8/2005 | Hsu | H04W 24/00 |
| | | | | 370/329 |
| 2006/0084404 | A1 | 4/2006 | Laroia et al. | |
| 2008/0071629 | A1 | 3/2008 | Benson et al. | |
| 2009/0186621 | A1* | 7/2009 | Umeda | H04L 1/0003 |
| | | | | 455/446 |
| 2009/0225874 | A1* | 9/2009 | She | H04L 1/0631 |
| | | | | 375/260 |
| 2011/0269502 | A1* | 11/2011 | Clark | H04B 1/006 |
| | | | | 455/552.1 |
| 2012/0140619 | A1 | 6/2012 | Chen | |
| 2013/0142052 | A1 | 6/2013 | Burbidge et al. | |
| 2013/0178225 | A1* | 7/2013 | Xing | H04W 16/14 |
| | | | | 455/454 |
| 2013/0252660 | A1 | 9/2013 | Bach | |
| 2014/0066050 | A1* | 3/2014 | Kotecha | H04W 88/06 |
| | | | | 455/422.1 |
| 2014/0295872 | A1 | 10/2014 | Chang et al. | |

FOREIGN PATENT DOCUMENTS

| | | |
|---|---|---|
| JP | 2007/515123 A | 6/2007 |
| KR | 1020140035859 A | 3/2014 |
| WO | WO2005/060209 A1 | 6/2005 |
| WO | WO2011137118 | 11/2011 |

OTHER PUBLICATIONS

Chang et al, "OFCDM Based Adaptive Modulation with Antenna Array in Fading Channels", 57th IEEE Semiannual Vehicular Technology Conf, Apr. 2003, 5 pgs.

Translated Japanese Office Action dated Aug. 22, 2011 in Japanese Patent Application No. 2008-52399, 4 pgs.

Noordin et al, "Adaptive Techniques in Orthogonal Frequency Divsion Multiplexing in Mobile Radio Environment", Intl Journal of Engineering and Technology, vol. 1,No. 2, 2004, pp. 115-123.

PCT Intl Search Report and Written Opinion dated Feb. 29, 2012, for PCT/US2011/043093, 9 pgs.

Supplemental European Search Report, dated Dec. 13, 2012, for Application No. EP 06788085, 10 pgs.

The Extended European Search Report dated Aug. 17, 2018, for European Application No. 15860411.6, 13 pages.

The Partial Supplementary European Search Report dated May 14, 2018 for European patent application No. 15860411.6, 16 pages.

* cited by examiner

APPLICATION-BASED MULTI-BAND TRANSMISSION

RELATED APPLICATIONS

This application is a continuation-in-part of U.S. patent application Ser. No. 14/076,548, filed Nov. 11, 2013, entitled "Frequency Band Adaptive Wireless Communication," which is a continuation of U.S. patent application Ser. No. 13/540,530, filed Jul. 2, 2012, entitled "Frequency Band Adaptive Wireless Communication," (now U.S. Pat. No. 8,583,047), which is a continuation of U.S. patent application Ser. No. 11/996,928, filed Jul. 2, 2008, entitled, "Frequency Band Adaptive Wireless Communication," (now U.S. Pat. No. 8,213,867), which is a national stage entry of PCT/US06/28334, filed Jul. 21, 2006, entitled, "Frequency Band Adaptive Wireless Communication," which claims the benefit of U.S. Provisional Patent Application No. 60/702,883, filed Jul. 27, 2005, each of which is hereby incorporated by reference in its entirety.

BACKGROUND

Conventional wireless devices are designed to work or operate in a specified frequency range or band with limited transmit power levels. The major types of frequency bands regulated by the Federal Communications Commission (FCC) include licensed bands, semilicensed bands, unlicensed bands and overlapped bands. The FCC has specific transmit power limits for each of the described bands to provide public safety and to reduce potential co band and adjacent band interference levels.

Example licensed frequency bands include cellular telephony or Personal Communication Service (PCS) bands, as well as Advanced Wireless Services (AWS) bands and Global System for Mobile Communications (GSM) bands. Cellular communications in the U.S. typically operate in the frequency ranges of 824-849 MHz, and 869-894 MHz. Further bands include 700 MHz bands, such as Band 12. Broadband PCS communications in the U.S. typically operate in the frequency ranges of 1850-4910 MHz and 1930-1990 MHz, while narrowband PCS typically operates in the frequency ranges of 901-902 MHz, 930-931 MHz, and 940-941 MHz. The 4940-4990 MHz band (referred to as the 4.9 GHz licensed band) is available but is designated by the FCC for support of public safety. Other licensed bands, such as those supporting Third Generation (3G) wireless communications, include frequency bands such as 1710-1755 MHz, 2110-2155 MHz, 2305-2320 MHz, 2345-2360 MHz (Wireless Communication Services, WCS band), and 2500-2690 MHz (Multichannel Multipoint Distribution Services, MMDS band).

Licensees to a licensed band usually have an exclusive right to provide services with the band in a specified geographic area, for a defined term and within specified times. The license is exclusive in the sense that no other service providers are typically allowed to provide services in the same band, in the same area and at the same time. Other licensed bands include, but are not limited to, a licensed band identified as allocated for WiMax (WiMAX is defined as Worldwide Interoperability for Microwave Access).

A semilicensed band in the 3.65 GHz to 3.7 GHz range is a nationwide band available to all licensees under nonexclusive terms. Licensees to the semilicensed band are required to coordinate among themselves to reduce mutual interference levels and to share the band equally when coexisting within the same region. The semilicensed band is free to all licensees and no limit is set on the number of licensees.

Unlicensed frequency bands such as Industrial Scientific and Medical (ISM) frequency bands and Unlicensed National Information Infrastructure (UNII) frequency bands are well known and can be shared by any number of devices. These unlicensed bands typically include frequencies such as 900 MHz, 2.4 GHz, 5.0 GHz and 5.8 GHz, which are commonly used for cordless telephones, wireless local area networks (WLANs) and Bluetooth devices.

Overlapped bands are frequency bands within the range from 3.1 GHz to 10.6 GHz. An example overlapped band is allocated for the use of so called ultra-wideband (UWB) devices. The UWB band is an unlicensed frequency band that overlaps with many licensed bands within its frequency range.

Radio communication links each utilize one or more component carriers in a single frequency band. Thus, a radio communication link may involve resource blocks or channels from one frequency band, such as a licensed, unlicensed, semi-licensed, or overlapped frequency band. This often results in certain frequency bands being heavily utilized and other frequency bands being underutilized.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, a radio access provider configured to select blocks or channels from frequency bands for wireless communication devices. The radio access provider may select blocks or channels from multiple frequency bands for at least one of the wireless communication devices. Further, the radio access provider may receive service priorities for active applications of the wireless communication devices and may select the blocks or channels based at least in part on the service priorities. For example, the radio access provider may select blocks or channels for wireless communication device(s) associated with a first service priority before selecting blocks or channels for wireless communication device(s) associated with a second service priority. For wireless communication devices associated with a same service priority, the radio access provider may select blocks or channels for one of those wireless communication devices with the weakest signal quality metrics first before selecting blocks or channels for other of those wireless communication devices.

In various implementations, in addition to or instead of selecting blocks or channels based on service priorities, the radio access provider may select blocks or channels for a radio communication link with a wireless communication device based on cross-correlations of blocks, channels, or frequency bands. The cross-correlated blocks, channels, or frequency bands may be pairs from multiple frequency bands or pairs received using multiple antennas.

In some implementations, the radio access provider may also receive indications from wireless communication devices of channels from unlicensed bands that are available to those wireless communication devices. The radio access provider may select some or all of those channels for uplink communications with the wireless communication devices.

In further implementations, the radio access provider may receive identifications of frequency bands available to a wireless communication device. That wireless communication device may identify those available bands based at least in part on signal quality metrics for frequency bands, power demands associated with transmission using respective frequency bands, and a power metric for that wireless communication device. For example, the wireless communication device may first use signal quality metrics to identify a first group of available frequency bands and may then use the power demands for that first group and the power metric to identify a subset of the first group of available frequency bands as the available frequency bands to report to the radio access provider.

Overview

Figure 1:
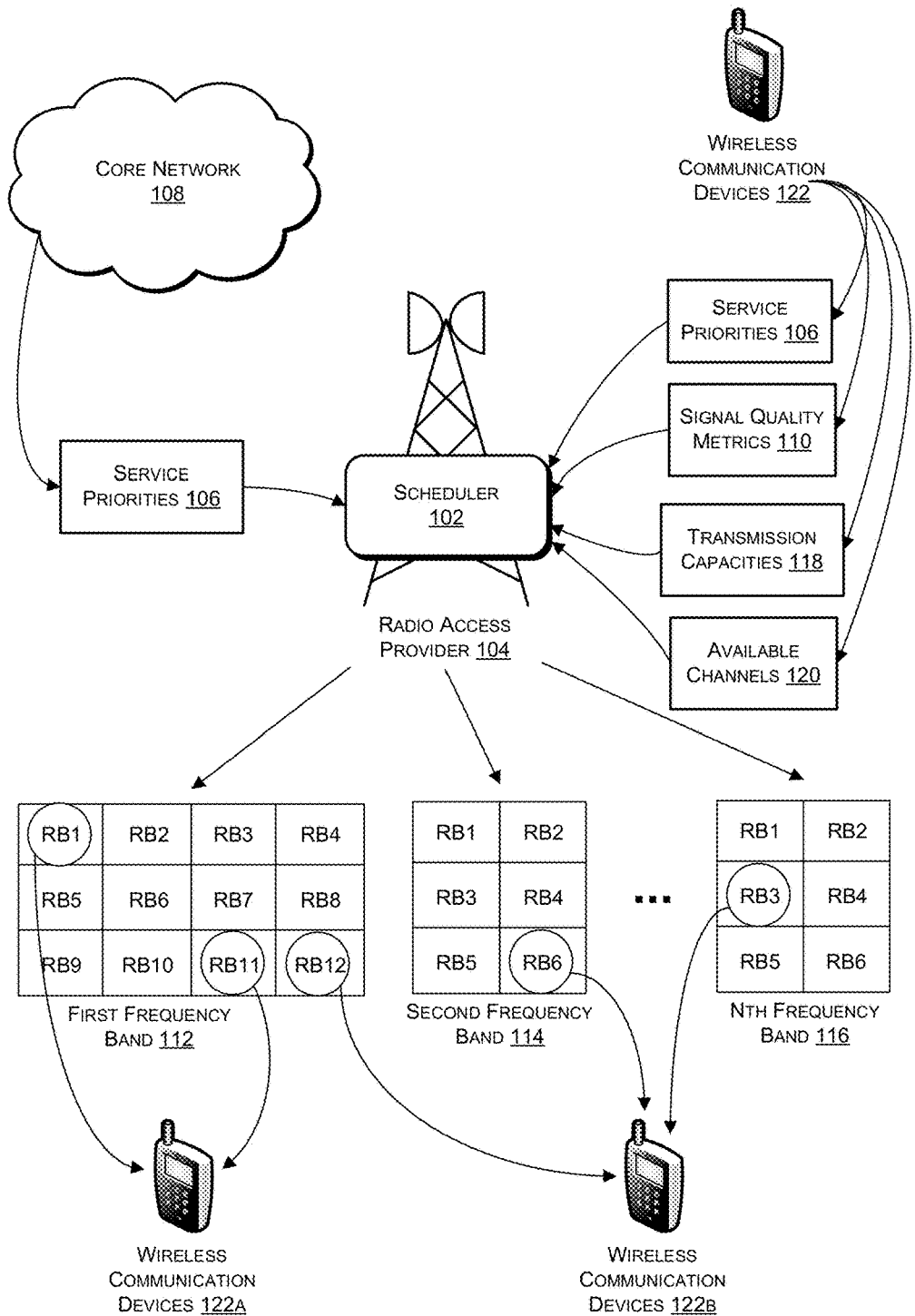
FIG. 1 illustrates an overview of a radio access provider configured to select blocks or channels from one or more frequency bands for wireless communication devices based on any or all of service priorities, signal quality metrics, power capacities, available unlicensed channels, or cross-correlations.

FIG. 1 illustrates an overview of a radio access provider configured to select blocks or channels from one or more frequency bands for wireless communication devices based on any or all of service priorities, signal quality metrics, power capacities, available unlicensed channels, or cross-correlations. As illustrated, a scheduler 102 of a radio access provider 104 may receive service priorities 106 from a core network 108 of a telecommunication network that includes the radio access provider 104 and the core network 108. The scheduler 102 may also receive signal quality metrics 110 for multiple frequency bands, such as a first frequency band 112, a second frequency band 114, and an Nth frequency band 116. Further, the scheduler may receive indications of transmission capacities 118 and available channels 120. The signal quality metrics 110, transmission capacities 118, and available channels 120 may be received from wireless communication devices 122, and the service priorities 106 may be associated with active applications of the wireless communication devices 122. Further, the scheduler 102 may also receive service priorities 106 for uplink traffic from the wireless communication devices 122. The scheduler 102 may select blocks or channels of the frequency bands 112-116 for the wireless communication devices 122. For example, the scheduler 102 may select two blocks from the first frequency band 112 for a wireless communication device 122A and three blocks for a wireless communication device 122B, including one block from each of the first frequency band 112, the second frequency band 114, and the Nth frequency band 116.

Figure 4:
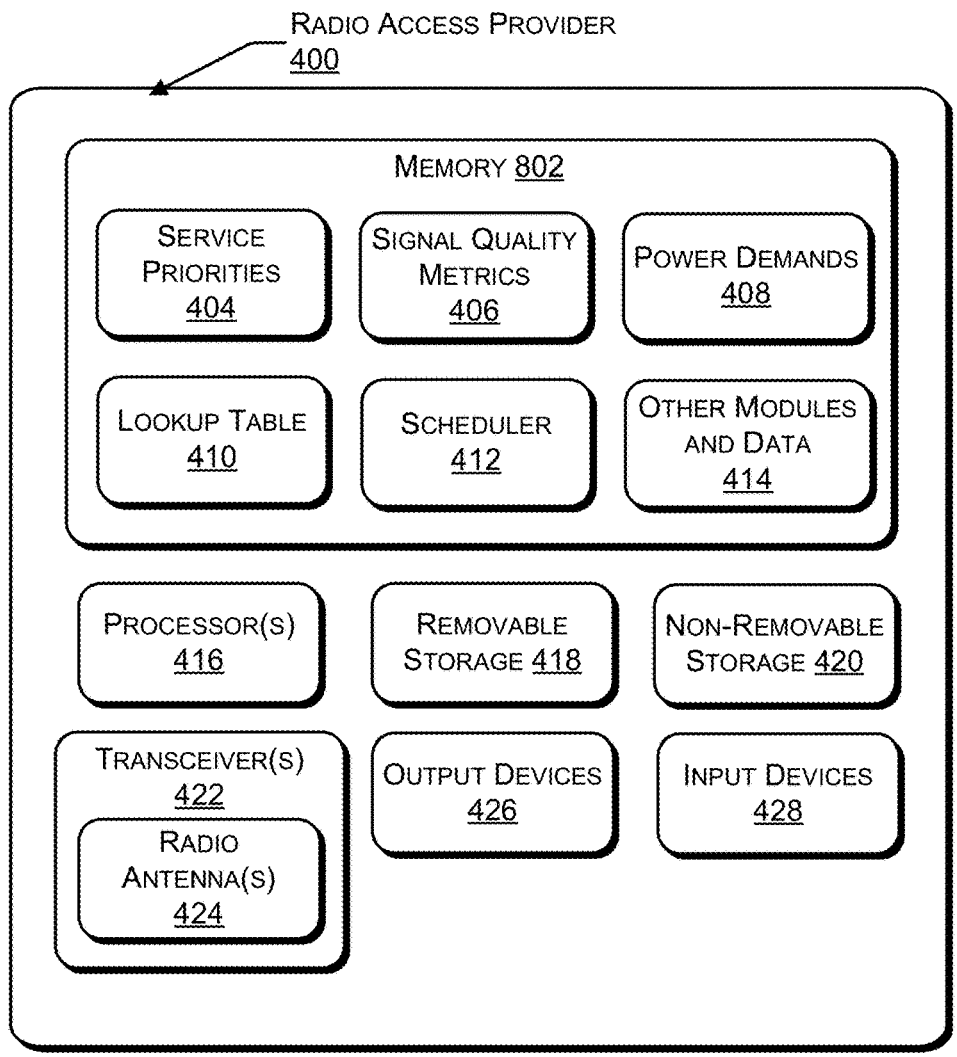
FIG. 4 illustrates a component level view of a radio access provider.

In various implementations, the radio access provider 104 may comprise any one or more base stations, node Bs, eNode Bs, or wireless access points (e.g., WiFi access points, WiMax access points, etc.). The radio access provider 104 may include components fixing the radio access provider 104 to a location and positioning the radio access provider 104 at that location, such as components of a cell tower. The radio access provider 104 may also support one or more cells of varying sizes, such as macrocells, microcells, picocells, femtocells, or other small cells, of one or more access networks of a telecommunication network. To provide wireless connectivity to the telecommunication network, the radio access provider 104 may be equipped with any number of components, such as radio antennas, transmitter components, receiver components, power amplifiers, combiners, duplexers, encoder components, decoder components, band pass filters, power sources, or control components, such as scheduler 102 (which is discussed in greater detail below). The radio access provider 104 may also be or include one or more computing devices, such as a server or server farm, multiple, distributed server farms, a mainframe, a work station, a personal computer (PC), a laptop computer, a tablet computer, an embedded system, or any other sort of device or devices. An example radio access provider 104 is illustrated in FIG. 4 and is described in detail below with reference to that figure.

In further implementations, the radio access provider 104 may transmit and receive over multiple frequency bands. Examples of such frequency bands may include a licensed frequency band, an unlicensed frequency band, a semi-licensed frequency band, an overlapped frequency band, a cellular frequency band, an AWS frequency band, a 700 MHz frequency band (e.g., band 12), an 800 MHz frequency band, a 900 MHz frequency band, a PCS frequency band, an 1800 MHz frequency band, a 1900 MHz frequency band, a 4.9 GHz frequency band, a GSM frequency band, a 2.4 GHz frequency band, a 5.0 GHz frequency band, a 5.8 GHz frequency band, a 3.65 GHz frequency band, a UWB frequency band, a frequency band in a range from 3.1-10.6 GHz, a 3G frequency band, a WCS frequency band, a MMDS frequency band, or a WiMax frequency band. The first frequency band 112, the second frequency band 114, and the Nth frequency band 116 may each be any of the example frequency bands. Each frequency band may include multiple resource blocks (alternatively referred to herein as "blocks") or channels which may be assigned by the scheduler 102 to wireless communication device 122 for downlink communications, uplink communications, or both.

In some implementations, the telecommunication network which includes the radio access provider 104 may include multiple other radio access providers associated with multiple other access networks, ensuring continued coverage as wireless communication devices 122 move from location to location. The telecommunication network may also include a core network 108, which may be, for example, a System Architecture Evolution (SAE) core network, a General Packet Radio Service (GPRS) core network, or any other sort of core network. The core network 108 may include a gateway GPRS support node (GGSN), a serving GPRS support node (SGSN), a mobile switching center (MSC), a home location register (HLR), a visitor location register (VLR), a mobility management entity (MME), a serving gateway (SGW), a packet data network gateway—also referred to as a packet gateway (PGW), a home subscriber server (HSS), or an evolved packet data gateway (ePDG). The access network(s) and core network 108 of the telecommunication network may associated with any one or more access technologies, such as 2G, 3G, 4G, 5G, GSM, CDMA, UMTS, HSPA, HSPA+, LTE, LTE-Advanced, WiFi, or WiMax.

Figure 5:
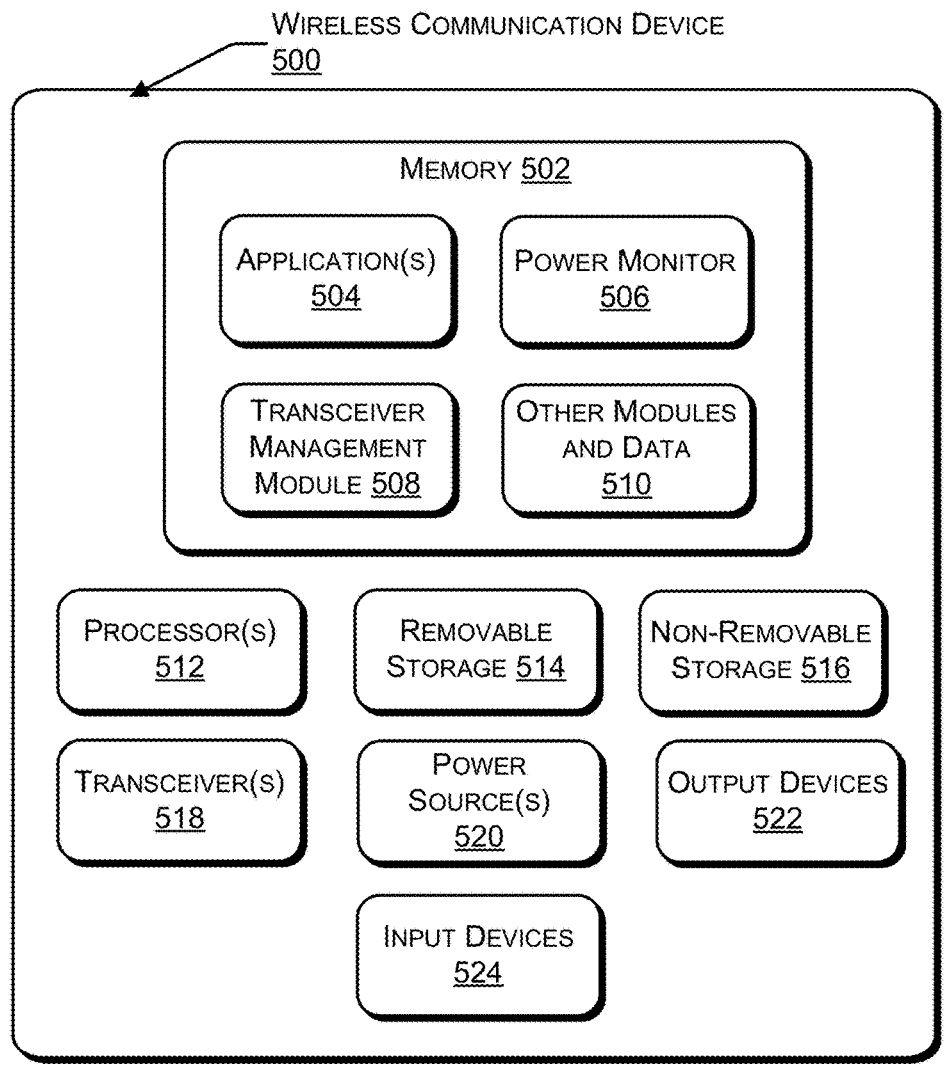
FIG. 5 illustrates a component level view of a wireless communication device.

In various implementations, the wireless communication devices 122 may each be any sort of computing device known in the art that is capable of communicating over one or more frequency bands. Examples of wireless communication devices 122 include a PC, a laptop computer, a server, a server farm(s), a mainframe, a tablet computer, a work station, a telecommunication device, a personal digital assistant (PDA), a media player, a media center device, a personal video recorder (PVR), a television, an electronic book reader, a set-top box, a camera, a video game console, a kiosk, a gaming device, processor(s), integrated components for inclusion in a computing device, an appliance, an electronic device for inclusion in vehicles, a gaming device, or any other sort of device. Further, an example wireless communication device 122 is illustrated in FIG. 5 and is described in detail below with reference to that figure.

In further embodiments, the frequency bands available to a wireless communication device 122 may change based on a location of that wireless communication device 122. For example, a wireless communication device 122 that is further from the radio access provider 104 may only be able to communicate over the first frequency band 112, but if that same wireless communication device 122 moved closer to the radio access provider 104, it may be able to communicate over both the first frequency band 112 and a second frequency band 114. This may be the case because the second frequency band 114 may have a shorter range (higher path loss) than the first frequency band 112.

Figure 2:
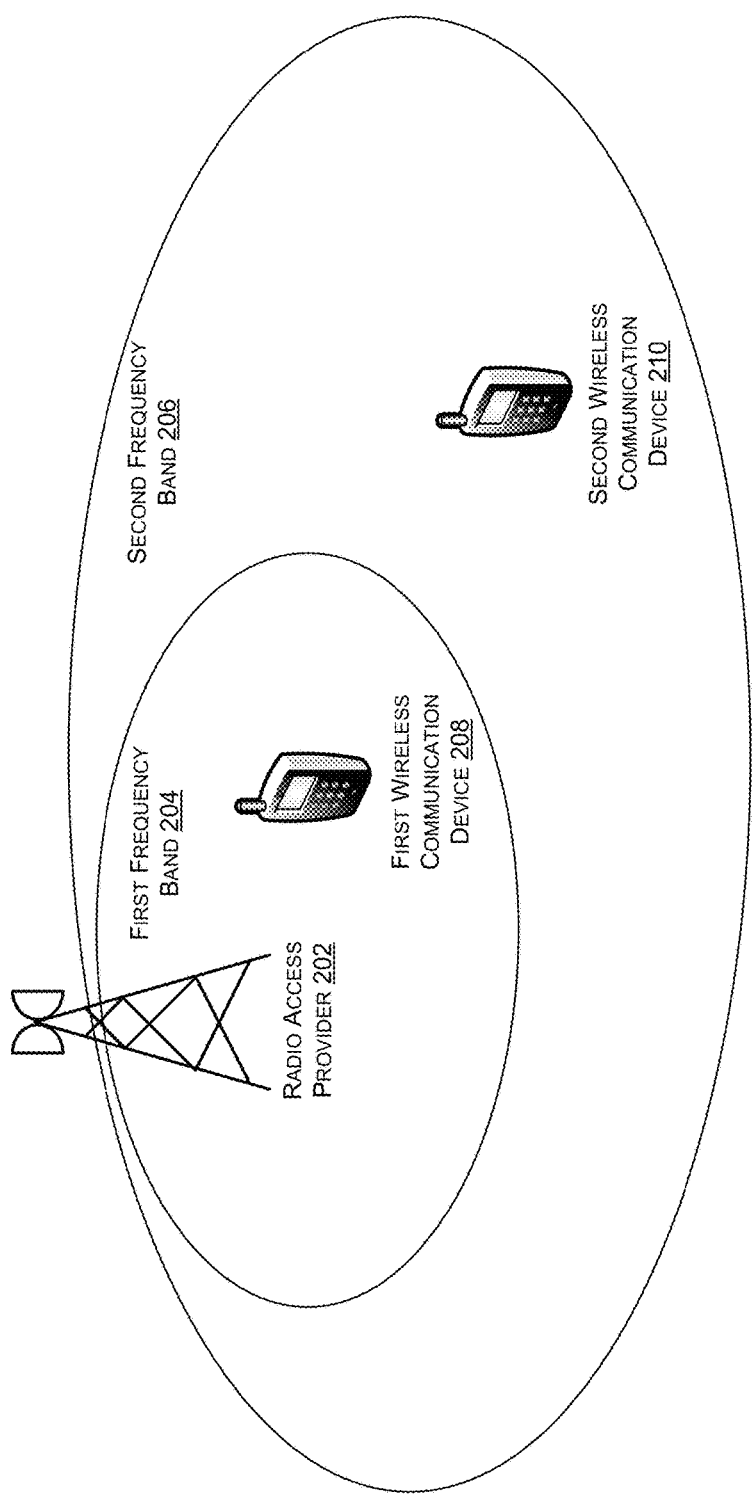
FIG. 2 illustrates an example environment including a radio access provider transmitting over first and second frequency bands, with wireless communication devices each able to communicate over one or more of those frequency bands.

FIG. 2 illustrates an example environment with such frequency bands having differing ranges (path losses). As illustrated in FIG. 2, a radio access provider 202 may send and receive communications over a first frequency band 204 and second frequency band 206. A first wireless communication device 208 may communicate with the radio access provider 202 over either or both of the first frequency band 204 or the second frequency band 206, and a second wireless communication device 210 may communicate with the radio access provider over the second frequency band 206. The radio access provider 202 may be an example of the radio access provider 104, the frequency bands 204 and 206 may each be an example of one of the frequency bands 112-116, and the wireless communication devices 204 and 206 may each be an example of a wireless communication device 122. The first frequency band 204 may have a shorter range (higher path loss) than the second frequency band 206, and only a wireless communication device that is closer to the radio access provider 202, such as the first wireless communication device 208, may communicate over the first frequency band 204. The frequency band(s) that the wireless communication devices 208-210 are able to communicate over may be dependent on the positions of the wireless communication devices 208-210.

In some implementations, the range of the first frequency band 204 may be extended by a repeater device (not shown). In such implementations, both of the wireless communication devices 208-210 may be able to communicate over both of the frequency bands 204-206.

Returning to FIG. 1, the radio access provider 104 may receive service priorities 106 for active applications of the wireless communication devices 122 from the core network 108 and from wireless communication devices 122. The service priorities 106 for downlink traffic may be received from the core network 108 and the service priorities for uplink traffic may be received from wireless communication devices 122. For example, a PGW of the core network 108 may be configured to identify service flows associated with active applications of wireless communication devices 122 and determine service priorities 106 based on those service flows. Also, when a wireless communication device 122 requests a link/radio bearer for a communication such as initiating a VoLTE call, it may indicate its service priority 106 in the uplink communications. The service priorities 106 may include, for example, quality-of-service class identifiers (QCI). The active applications may be any of a Voice-over-Long-Term-Evolution (VoLTE) calling application, a voice calling application, a video calling application, a video chat application, a video streaming application, a gaming application, a messaging application, an email application, a social networking application, a web browser application, a real-time communication application, or any application that engages in communication with a remote device. In some implementations, real-time communication applications may be associated with higher service priorities 106 than other active applications. The PGW and/or wireless communication devices 122 may determine the service priorities 106 periodically or on an event-driven basis (e.g., responsive to changes to the service flows) and may then inform radio access providers, such as radio access provider 104, of the wireless communication devices, such as wireless communication devices 122, associated with the service flows of the determined service priorities 106.

In further implementations, a service provider associated with the telecommunication network may enable subscribers, such as users of the wireless communication devices 122, to purchase higher service priorities 106 in order to obtain better services. The service provider may enable purchase of improved service priorities 106 across the board or may only offer the ability to purchase improved service priorities 106 for certain applications or classes of applications.

In various implementations, in addition to receiving the service priorities 106 associated with the wireless communication devices 122, the radio access provider 104 may receive identifications from the wireless communication devices 122 of frequency bands that are available to those wireless communication devices 122, as well as signal quality metrics 110 associated with those available frequency bands or with specific blocks or channels from those available frequency bands. Examples of signal quality metrics 110 include a channel quality indicator (CQI), a rank indicator (RI), a pre-coding matrix indicator (PMI), a noise level, an interference level, a received signal strength indication (RSSI) level, a spectral integrity, a data throughput rate, a bit-error rate (BER), a symbol-error rate (SER), a block-error rate (BLER), a frame-error rate (FER), a mean-square error (MSE), a signal-to-noise rating, a noise-plus-interference level, or a signal-to-noise-plus-interference rating. In some examples, the radio access provider may instead receive an average or median of such signal quality metrics 110, or may receive both the signal quality metrics 110 themselves and the average or median.

The wireless communication devices 122 may be configured to determine, e.g., on a periodic basis, a list of blocks, channels, or frequency bands by, for instance, receiving reference signals over those frequency bands from the radio access provider 104. For each of these blocks, channels, or signals, the wireless communication devices 122 may determine a signal quality metric 110 and may compare the determined signal quality metrics to one or more thresholds. The wireless communication devices 122 may then notify, via an uplink connection, the radio access provider 104 of those blocks, channels, or frequency bands which meet or exceed the threshold(s) and may provide the signal quality metrics 110 associated with those blocks, channels, or frequency bands to the radio access provider 104. The wireless communication devices 122 may also calculate averages or medians of the signal quality metrics 110 of the available frequency bands and may report the averages or medians to the radio access provider 104.

In some implementations, the wireless communication devices 122 may also take into account their own available power resources and power demands associated with transmission over different frequency bands. The wireless communication devices 122 may receive indications of the power demands from the radio access provider 104 or from a previous radio access provider, which may in turn receive the power demands from the telecommunication network. Alternatively, the wireless communication devices 122 may be configured to attempt transmission on various frequency bands and to record power demands associated with those transmissions. The wireless communication devices 122 may also receive or retrieve power metric from, e.g., power monitors. The power metrics may be indicative of power available to the wireless communication devices 122. Using its power metric and power demands, a wireless communication device 122 can determine a subset of the available frequency bands (e.g., those frequency bands with signal quality metrics 110 meeting or exceeding a threshold). For example, frequency bands 112-116 may each be available, but the wireless communication device 122 may not have sufficient power to transmit over the Nth frequency band 116. In such an example, the wireless communication device 122 may determine a subset including the frequency bands 112-114 and may indicate to the radio access provider 104 that frequency bands 112-114 are available. In another example, the wireless communication device 122 may have power to transmit over any two of the frequency bands 112-116, but not all three. In such an example, the wireless communication device 122 may indicate the alternative subsets to the radio access provider as the transmission capacities 118.

Alternatively, the wireless communication devices 122 may rely on the radio access provider 104 to consider the power available to the wireless communication device 122 and may each provide its power metric and, optionally, power demands, to the radio access provider as transmission capacities 118. The radio access provider 104 may then use those transmission capacities and signal quality metrics 110 to determine the frequency bands available to the wireless communication devices 122.

In addition to signal quality metrics 110 and power considerations, the wireless communication devices 122 may calculate cross-correlation scores for pairs of blocks, channels, or frequency bands based on any reference signals received for those blocks, channels, or frequency bands from downlink communications. Techniques for selecting pairs of blocks, channels, or frequency bands to cross-correlation and for generating a lookup table of those cross-correlation scores are discussed further herein. Based on the cross-correlation scores, the wireless communication devices 122 may eliminate any pairs of blocks, channels, or frequency bands from a list of available frequency bands. For example, pairs of blocks, channels, or frequency bands with cross-correlation scores falling below a threshold may not be considered available frequency bands. The wireless communication devices 122 may then report the cross-correlation scores to the radio access provider along with the identifications of available frequency bands.

In various embodiments, the wireless communication devices 122 may also be configured to determine which channels of unlicensed frequency bands are available and to report those channels as the available channels 120 to the radio access provider 104. For example, the wireless communication devices 122 may scan unlicensed channels on a pre-set time interval or one demand from the telecommunication network, may determine RSSI measurements for unlicensed channels, and may report all channels that have RSSI measurements exceeding a threshold as available channels 120.

In various implementations, upon receiving any or all of the service priorities 106, the signal quality metrics 110, the transmission capacities 118, or the available channels, the radio access provider 104 may provide that information to its scheduler 102 to select blocks or channels from one or more of the frequency bands 112-116 for radio communication links with the wireless communication devices 122. The scheduler 102 may repeat selecting blocks or channels at each transmission time interval (TTI) and may select blocks or channels for both uplink and downlink communications. The scheduler 102 may select blocks or channels for downlink communications with wireless communication devices 122 before selecting any blocks or channels for uplink communications or may select blocks or channels for both uplink and downlink communications with a wireless communication device 122 before selecting blocks or channels for another wireless communication device 122.

At each new TTI, the scheduler 102 may first group the wireless communication devices 122 by service priority 106 and may select blocks or channels for radio communication links with all wireless communication devices 122 of a given service priority 106 (e.g., a higher service priority) before selecting blocks or channels for radio communication links with any wireless communication devices 122 of other service priorities 106 (e.g. lower service priorities). Within each service priority group, the scheduler 102 may order the wireless communication devices 102 within that group based on average or media signal quality metrics 110. For example, if the signal quality metrics 110 for a wireless communication device 122 include CQI for three frequency bands, the scheduler 102 may calculate an average or median of those CQI (or, as discussed above, the scheduler 102 may receive the average/median from the wireless communication device 122). The scheduler 102 may order the wireless communication devices 122 from a wireless communication device 122 with a weakest average or median signal quality metric to a wireless communication device 122 with a strongest average or median signal quality metric. The scheduler 102 may then select blocks or channels for wireless communication devices 122 based on that order.

When selecting blocks or channels for a wireless communication device 122, the scheduler 102 may utilize a cost-function which takes into account the available, unassigned blocks or channels, frequency bands available to wireless communication device 122, as well as coding and modulation, transmission modes, transmission scenarios (e.g., multiband multiplexing, frequency diversity, frequency hopping, band hopping and a variety of combinations of these and other transmission scenarios), cross-correlation scores, and any guaranteed bit rate, quality-of-service (QoS), delay, or jitter requirements for the active application or user of the wireless communication device 122. Utilizing this information, the scheduler may select blocks or channels from a single frequency band or from multiple frequency bands. If multiple frequency bands, the multiple frequency bands may include frequency bands with high path loss and low path loss or both licensed and unlicensed frequency bands.

In FIG. 1, the scheduler 102 selects blocks 1 and 11 from the first frequency band 112 for a wireless communication device 122A and selects block 12 from the first frequency band 112, block 6 from the second frequency band 114, and block 3 from the Nth frequency band 116 for a wireless communication device 122B. In such an example, wireless communication device 122a may have a higher service priority 106 than wireless communication device 122b, or, if wireless communication device 122a and wireless communication device 122b have a same service priority 106, wireless communication device 122a may have a lower average or median signal quality metric than wireless communication device 122b.

In various implementations, the scheduler 102 may receive identifications of multiple alternative subsets of available frequency bands for a wireless communication device 122 (e.g., in the form of transmission capacities 118). Alternatively, the scheduler 102 (or another component of the radio access provider 104) may utilize any power metric, power demands, and signal quality metrics 110 for a wireless communication device 122 to determine multiple alternative subsets. The scheduler 102 may then utilize these received or determined multiple alternative subsets with the cost function and the other above-mentioned inputs to the cost function to select blocks or channels for a wireless communication device 122. The scheduler 102 may utilize the alternative subsets when selecting blocks or channels for uplink communication with the wireless communication device 122. Because power may not be as much of a concern for downlink communications, more frequency bands may be available for downlink communications than for uplink communications.

In further embodiments, the scheduler 102 may further utilize the identifications of available channels 120 for a wireless communication device 122 and select some or all of these channels for uplink communication with the wireless communication device 122. Based on the selected channels, the radio access provider 104 may utilize beam-forming for receiving (or transmitting if used for downlink) communications over that/those selected unlicensed channel(s). The scheduler 102 or other radio access provider component may also determine a transmit power to be used for the selected unlicensed channel(s) and notify the wireless communication device 122 of both the selection of the unlicensed channel(s) and the determined transmit power. Also, in some implementations, the scheduler 102 may select a group of the unlicensed channel(s) for the uplink communication and both the radio access provider 104 and the wireless communication device 122 may perform channel hopping among the selected group of unlicensed channels in either a pre-set or random hopping pattern. Also, in some implementations, the scheduler 102 may select a same unlicensed channel or channels for both uplink and downlink communication with a wireless communication device 122.

In various implementations, the cross-correlations input to the cost function may be scores received from wireless communication devices 122, scores calculated by the radio access provider 104, or some combination of both. To calculate cross-correlation scores for any pair of blocks, channels, or frequency bands, the reference signals for those blocks, channels, or frequency bands may be correlated, resulting in a cross-correlation score. The cross-correlation scores and associated blocks, channels, or frequency bands may then be used to build a lookup table. The scheduler 102 may reference such a lookup table for input to the cost function. In some implementations, different lookup tables may be built for uplink and downlink.

In selecting which pairs of blocks, channels, or frequency bands to cross-correlate, a number of approaches may be used. For example, the two closest block or two furthest separated blocks of two different frequency bands may be paired for cross-correlation. Also, when the radio access provider 104 has multiple radio antennas, the two closest block or two furthest separated blocks from two different ones of the radio antennas may be paired for cross-correlation.

Figure 3A:
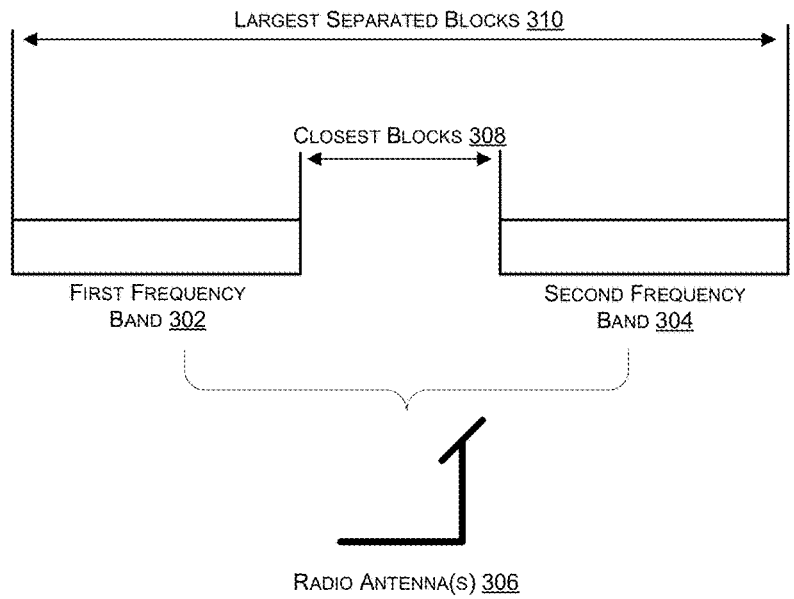
FIGS. 3a-3b illustrates example block selections from multiple frequency bands for cross-correlation.
Figure 3B:
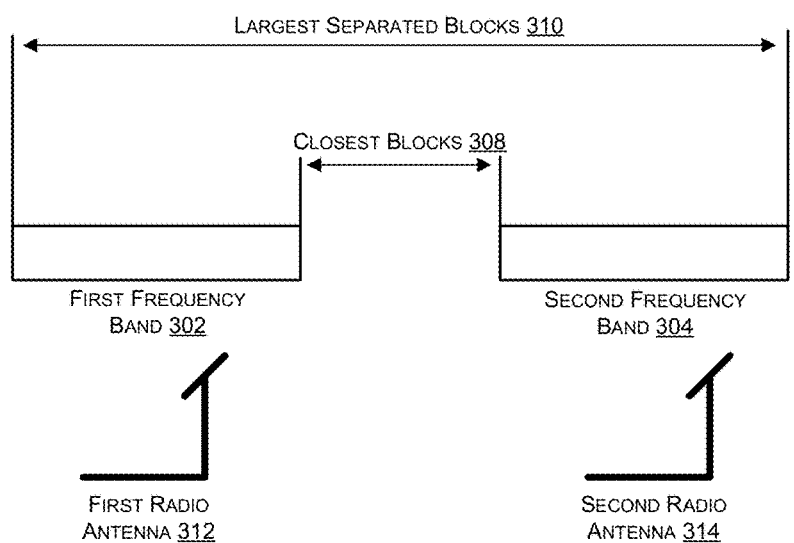

FIGS. 3a-3b illustrates examples of such block selections/pairings from multiple frequency bands for cross-correlation. FIG. 3a shows a first frequency band 302, a second frequency band 304, and radio antenna(s) 306 transmitting and/or receiving on both the first frequency band 302 and the second frequency band 304. In such an implementation, either or both of a pair of the closest blocks 308 of the first frequency band 302 and the second frequency band 304 or the largest separated blocks 310 of the first frequency band 302 and the second frequency band 304 may be selected to cross-correlate.

FIG. 3b shows a first frequency band 302, a second frequency band 304, a first radio antenna 312 transmitting and/or receiving on the first frequency band 302, and a second radio antenna 314 transmitting and/or receiving on the second frequency band 304. In such an implementation, either or both of a pair of the closest blocks 308 of the first frequency band 302 and the second frequency band 304 or the largest separated blocks 310 of the first frequency band 302 and the second frequency band 304 may be selected to cross-correlate.

Returning to FIG. 1, the scheduler 102 may coordinate with a scheduler of another radio access provider in selecting blocks or channels for a radio communication link with a wireless communication device 122, with each scheduler selecting a part of the blocks or channels used to communicate with the wireless communication device 122. The wireless communication device 122 may be configured to communicate with both radio access providers in such implementations. The schedulers may communicate with each other to coordinate selection of blocks or channels over, e.g., an X2 interface.

After completing selection of blocks or channels for the TTI, or while selecting blocks or channels for the TTI, the radio access provider 104 may notify the wireless communication devices 122 of the blocks or channels selected for uplink and/or downlink communications with those wireless communication devices 122. If no blocks or channels are available for a given wireless communication device 122, the radio access provider 104 may deny a request of the wireless communication device 122 for resource allocation and may, optionally, migrate that wireless communication device 122 to a different radio access provider. The radio access provider 104 and wireless communication devices 122 may then use the selected blocks or channels for communication during the TTI.

In various implementations, the blocks or channels selected for a radio communication link with a wireless communication device 122 may vary with time based on changes to active applications used on the wireless communication device 122, based on a location of the wireless communication device 122, based on power available to the wireless communication device 122, based on fluctuating signal qualities, based on usage of the frequency bands by other wireless communication devices 122, etc. The same block/channel selections may be kept for a new TTI, however, if nothing has changed since the last TTI.

Example Devices

FIG. 4 illustrates a component level view of a radio access provider. As illustrated, the radio access provider 400 comprises a system memory 402 storing service priorities 404, signal quality metrics 406, power demands 408, lookup table 410, scheduler 412, and other modules and data 414. Also, the radio access provider 400 includes processor(s) 416, a removable storage 418, a non-removable storage 420, transceiver(s) 422, radio antenna(s) 424, output device(s) 426, and input device(s) 428.

In various implementations, system memory 402 is volatile (such as RAM), non-volatile (such as ROM, flash memory, etc.) or some combination of the two.

The service priorities 404 may be an example of service priorities 106, which are described above in detail. The radio access provider 400 may receive the service priorities 404 from a device of a core network, such as a packet gateway of, e.g., the core network 108. The radio access provider 400 may also receive the service priorities from wireless communication devices, such as wireless communication devices 122. The radio access provider 400 may receive the service priorities 404 periodically or in response to any changes to the service priorities 404 and may, for instance, maintain the service priorities 404 in a data store.

The signal quality metrics 406 may be an example of signal quality metrics 110, which are described above in detail. The radio access provider 400 may receive the signal quality metrics 406 from wireless communication devices, such as wireless communication devices 122. Further, the radio access provider 400 may receive the signal quality metrics 406 periodically or in response to any changes to the signal quality metrics 406 and may, for instance, maintain the signal quality metrics 406 in a data store.

The power demands 408 may be received from the telecommunication network or radio access provider and may represent a power consumption associated with transmission by a wireless communication device, such as a wireless communication device 122, over a frequency band, such as one of frequency bands 112-116, or a power level to be achieved or maintained at an uplink receiver of a radio access provider. The radio access provider 400 may provide these power demands 408 to wireless communication devices to enable the wireless communication devices to determine available frequency bands based at least in part on the power demands 408. Alternatively or additionally, the scheduler 412 may utilize the power demands 408 in conjunction with the transmission capacities and signal quality metrics to better identify appropriate frequency bands, blocks, or channels for wireless communication devices.

The lookup table 410 may store cross-correlation score and associated pairs of blocks, channels, or frequency bands. It may be generated by the scheduler 412, by another component of the radio access provider 400, by a wireless communication device, or by some combination of these. Details of the generation and use of the lookup table 410 are described in greater detail here.

The scheduler 412 may be an example of scheduler 102, which is described above in detail. The scheduler 412 may select blocks or channels for radio communication links for wireless communication devices in either or both of uplink or downlink directions. The scheduler 412 may perform the selecting for each TTI. When selecting blocks or channels, the scheduler 412 may utilize any or all of service priorities 404, signal quality metrics 406, power demands 408, the lookup table 410, transmission capacities, or indications of available uplink channels. The scheduler 412 may select based on service priority first and then, within service priority, may select based on signal quality metrics. Also or instead, the scheduler 412 may select based on a cost function, on cross-correlations, on GBRs, or on transmission scenarios. In addition to selecting blocks or channels, the scheduler 412 may generate or participate in building the lookup table 410 or may determine frequency bands available to wireless communication devices.

The other modules or data 414 stored in the system memory 402 may comprise any sort of applications or platform components of the radio access provider 400, as well as data associated with such applications or platform components.

In some implementations, the processor(s) 416 is a central processing unit (CPU), a graphics processing unit (GPU), or both CPU and GPU, or any other sort of processing unit.

Non-transitory computer-readable media may include volatile and nonvolatile, removable and non-removable tangible, physical media implemented in technology for storage of information, such as computer readable instructions, data structures, program modules, or other data. System memory 402, removable storage 418 and non-removable storage 420 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the radio access provider 400. Any such non-transitory computer-readable media may be part of the radio access provider 400.

In some implementations, the transceiver(s) 422 include any sort of transceivers known in the art. For example, transceiver(s) 422 may include a radio transceiver that performs the function of transmitting and receiving radio frequency communications via one or more radio antenna(s) 424, such as an array of radio antennas 424. The transceiver(s) 422 may facilitate wireless connectivity between the radio access point 400 and wireless communication devices, such as wireless communication devices 122, over one or more frequency bands, such as frequency bands 112-116. In addition, the transceiver(s) 422 may include wired communication components, such as an Ethernet port, that connect the radio access point 400 in a wired fashion to one or more devices of a telecommunication network, including devices of a core network 108 of such a telecommunication network.

In some implementations, the output devices 426 include any sort of output devices known in the art, such as a display (e.g., a liquid crystal display), speakers, a vibrating mechanism, signaling lights, or a tactile feedback mechanism. Output devices 426 also include ports for one or more peripheral devices, such as headphones, peripheral speakers, or a peripheral display. In further implementations, the radio access provider 400 may not include any output devices 426 or may only include ports of peripheral devices.

In various implementations, input devices 428 include any sort of input devices known in the art. For example, input devices 428 may include a camera, a microphone, a keyboard/keypad, a touch-sensitive display, buttons, or other physical controls or switches. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

FIG. 5 illustrates a component level view of a wireless communication device. As illustrated, the wireless communication device 500 comprises a system memory 502 storing applications 504, a power monitor 506, a transceiver management module 508, and other modules and data 510. Also, the wireless communication device 500 includes processor(s) 512, a removable storage 514, a non-removable storage 516, transceiver(s) 518, power source(s) 520, output device(s) 522, and input device(s) 524.

In various implementations, system memory 502 is volatile (such as RAM), non-volatile (such as ROM, flash memory, etc.) or some combination of the two.

The applications 504 may be any sort of applications, such as a VoLTE calling application, a voice calling application, a video calling application, a video chat application, a video streaming application, a messaging application, an email application, a social networking application, a web browser application, a real-time communication application, or any application that engages in communication with a remote device. Each application may have its own service priority and these service priorities of the application 504 may be shared with a scheduler of a radio access provider through uplink communications.

The power monitor 506 may be configured to determine power available through the power source(s) 520 and may, in some instances, be implemented entirely or in part in a physical component coupled to the power source(s) 520. In addition to reporting available power, the power monitor 506 may, in some implementations, be able to determine power demands associated with transmission using one or more of the transceiver(s) 518 and a specific block, channel, or frequency band.

The transceiver management module 508 may be configured to determine signal quality metrics for one or more frequency bands via the transceiver(s) 518 and to determine power demands associated with transmission over the one or more frequency bands. The transceiver management module 508 may further identify available frequency bands, including any available channels of unlicensed frequency bands, based on the determined signal quality metrics, the determined power demands, and on a power metric obtained from the power monitor 506. Additional details of these operations are described above with respect to FIG. 1. The transceiver management module 508 may then notify the radio access provider of the available frequency bands, and may also provide any or all of the determined signal quality metrics, the available unlicensed channels, and transmission capacity information, such as the power demands, the power metric, or both.

The other modules or data 510 stored in the system memory 502 may comprise any sort of applications or platform components of the wireless communication device 500, as well as data associated with such applications or platform components.

In some implementations, the processor(s) 512 is a central processing unit (CPU), a graphics processing unit (GPU), or both CPU and GPU, or any other sort of processing unit.

Non-transitory computer-readable media may include volatile and nonvolatile, removable and non-removable tangible, physical media implemented in technology for storage of information, such as computer readable instructions, data structures, program modules, or other data. System memory 502, removable storage 514 and non-removable storage 516 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the wireless communication device 500. Any such non-transitory computer-readable media may be part of the wireless communication device 500.

In some implementations, the transceiver(s) 518 include any sort of transceivers known in the art. For example, transceiver(s) 518 may include a radio transceiver that performs the function of transmitting and receiving radio frequency communications via an antenna. The transceiver(s) 518 may facilitate wireless connectivity between the wireless communication device 500 and radio access providers, such as radio access provider 104. In addition, the transceiver(s) 518 may also include a wireless communication transceiver and a near field antenna for communicating over unlicensed wireless IP networks, such as local wireless data networks and personal area networks (e.g., Bluetooth or near field communication (NFC) networks). Further, the transceiver(s) 518 may include wired communication components, such as an Ethernet port, that connect the wireless communication device 500 in a wired fashion to one or more other devices.

In further implementations, the power source(s) 520 include any sort of power source or power sources known in the art, such as batter(ies), port(s) to receive charge through power cable(s) plugged into outlet(s), or some combination thereof. The batter(ies) may or may not be rechargeable. The power source(s) 520 may also be coupled to one or more power monitors, such as the power monitor 506, or to components of such power monitors.

In some implementations, the output devices 522 include any sort of output devices known in the art, such as a display (e.g., a liquid crystal display), speakers, a vibrating mechanism, or a tactile feedback mechanism. Output devices 522 also include ports for one or more peripheral devices, such as headphones, peripheral speakers, or a peripheral display.

In various implementations, input devices 524 include any sort of input devices known in the art. For example, input devices 524 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Example Processes

Figure 6:
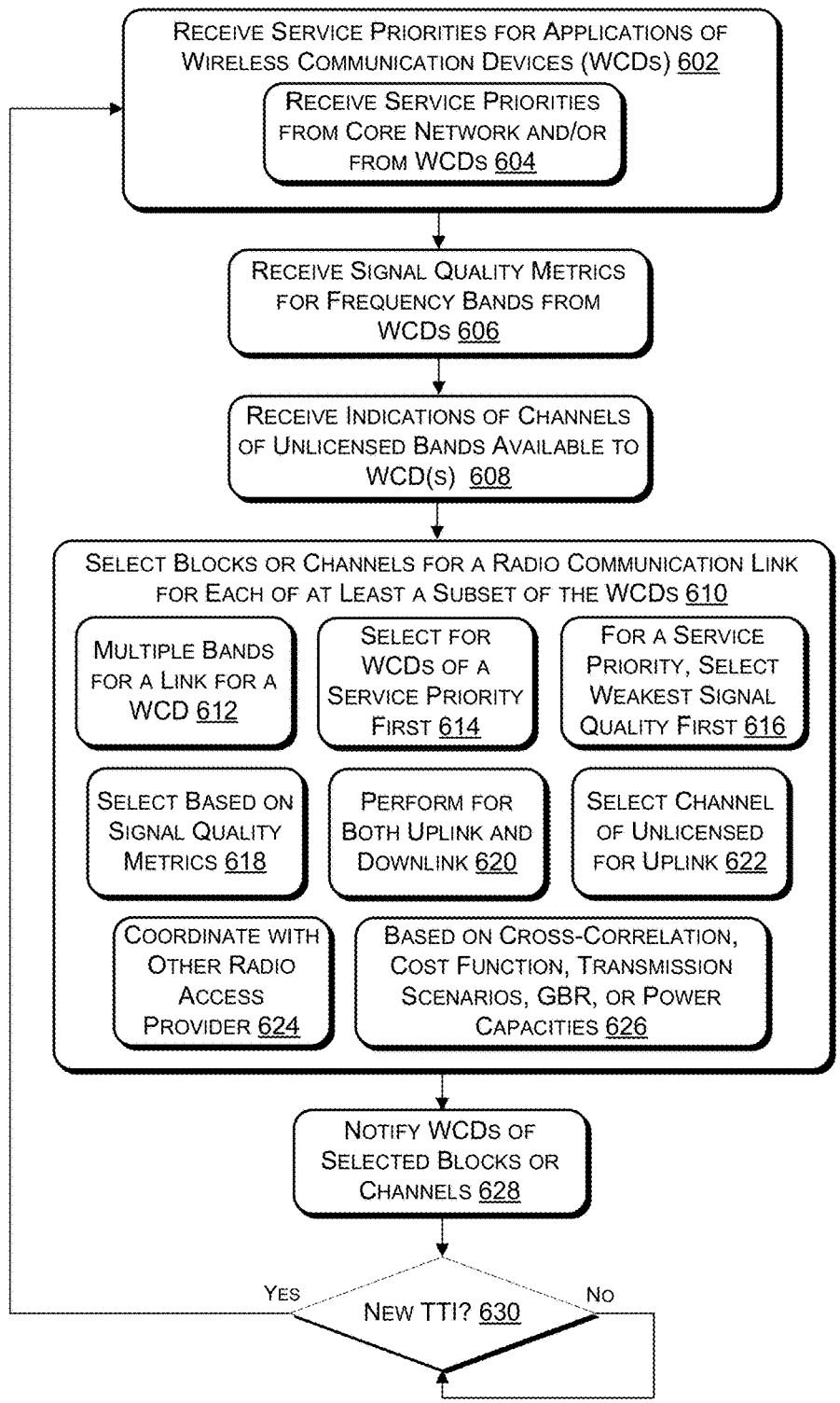
FIG. 6 illustrates an example process for selecting blocks or channels from frequency bands for radio communication links with wireless communication devices based on service priorities of applications of the wireless communication devices.
Figure 7:
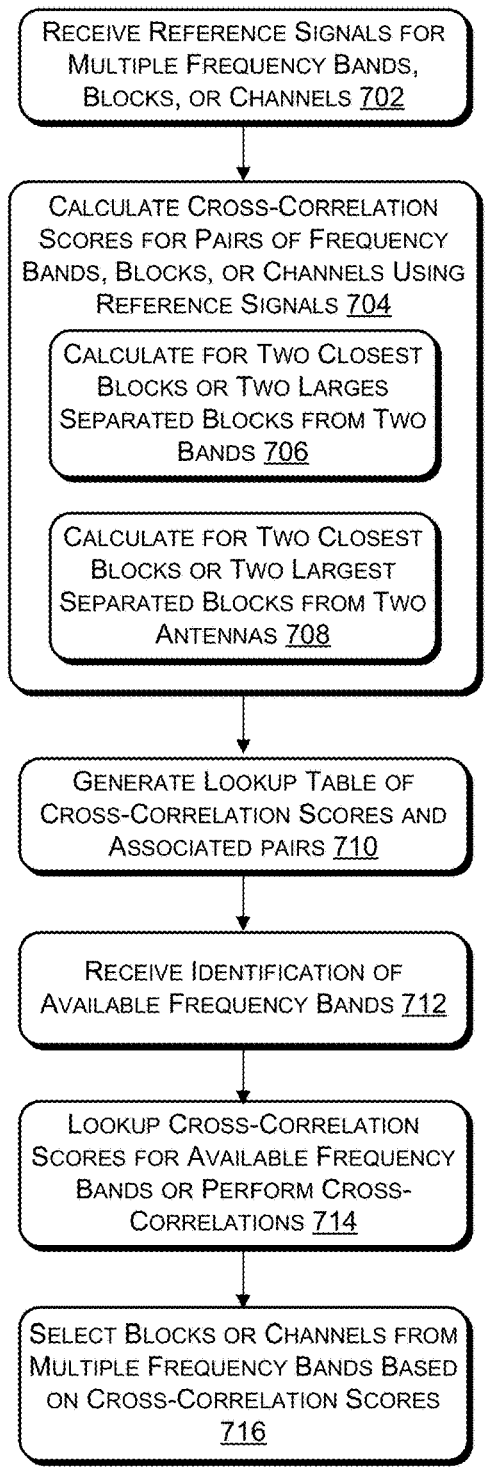
FIG. 7 illustrates an example process for selecting blocks or channels from frequency bands for radio communication links with wireless communication devices based on cross-correlations of blocks, channels, or frequency bands.
Figure 8:
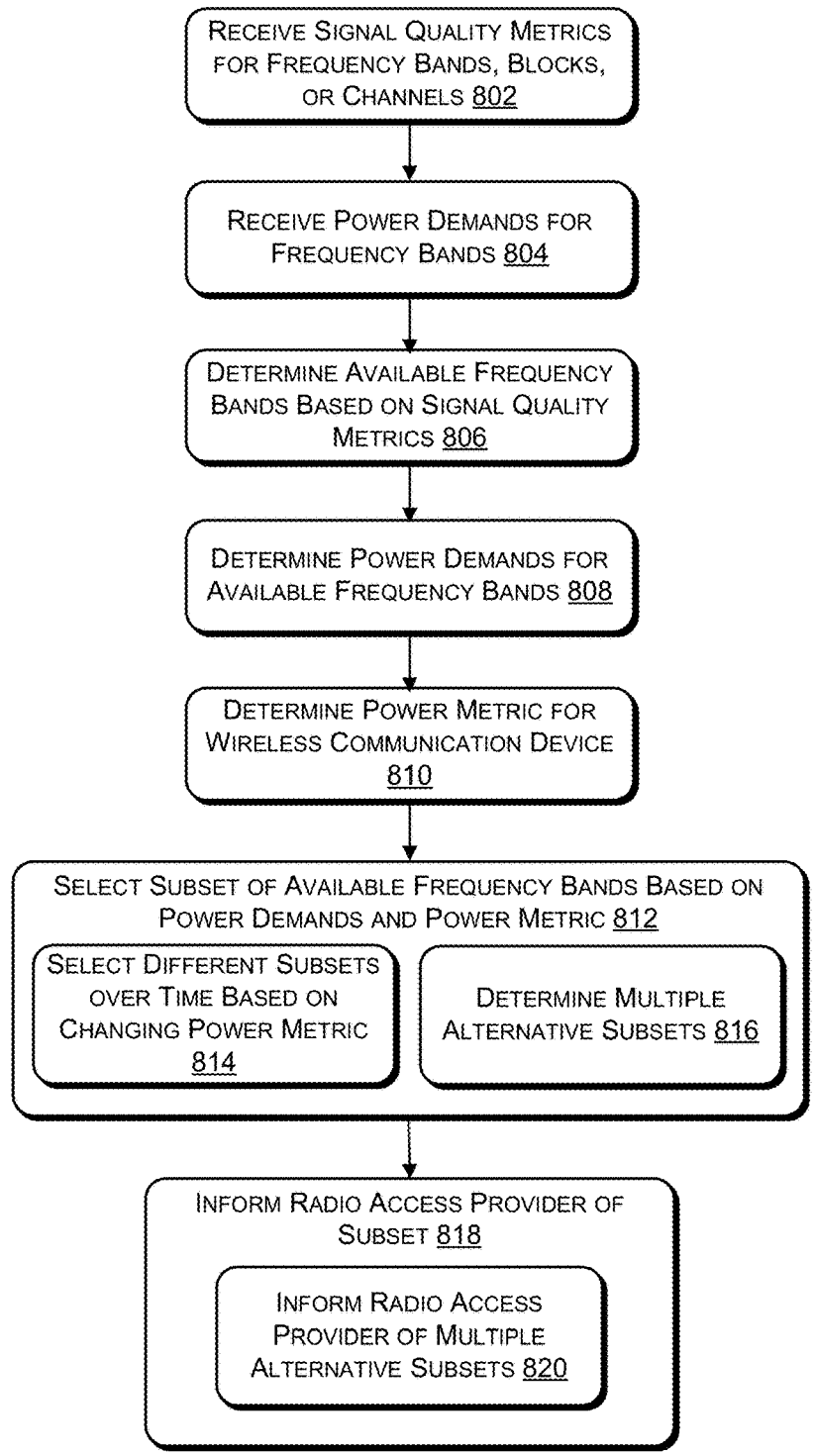
FIG. 8 illustrates an example process for determining, by a wireless communication device, available frequency bands based on associated power demands and on a power metric for the wireless communication device and informing a radio access provider of the available frequency bands.

FIGS. 6-8 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 6 illustrates an example process for selecting blocks or channels from frequency bands for radio communication links with wireless communication devices based on service priorities of applications of the wireless communication devices. The process includes, at 602, receiving, by a radio access provider, service priorities for wireless communication devices capable of communicating with the radio access provider over frequency bands. The service priorities may be associated with active applications of the wireless communication devices. The active applications may include at least one of a VoLTE calling application, a voice calling application, a video calling application, a video chat application, a video streaming application, a gaming application, a messaging application, an email application, a social networking application, a web browser application, a real-time communication application, or any application that engages in communication with a remote device.

At 604, the service priorities may be QCI and the radio access provider may receive the QCI for downlink traffic from a core network associated with the radio access provider and may receive the QCI for uplink traffic from wireless communication devices. In some implementations, the QCI for a specific application or QCIs for a specific user of at least one of the wireless communication devices may be adjusted based on a service plan of the specific user or based on purchase of a higher QCI or QCIs.

At 606, the radio access provider may also receive signal quality metrics for the wireless communication devices associated with blocks, channels, or frequency bands available to the wireless communication devices. In some implementations, the available frequency bands may include one or more of a licensed frequency band, an unlicensed frequency band, a semi-licensed frequency band, an overlapped frequency band, a cellular frequency band, an AWS frequency band, a 700 MHz frequency band, an 800 MHz frequency band, a 900 MHz frequency band, a PCS frequency band, an 1800 MHz frequency band, a 1900 MHz frequency band, a 4.9 GHz frequency band, a GSM frequency band, a 2.4 GHz frequency band, a 5.0 GHz frequency band, a 5.8 GHz frequency band, a 3.65 GHz frequency band, a UWB frequency band, a frequency band in a range from 3.1-10.6 GHz, a 3G frequency band, a WCS frequency band, a MMDS frequency band, or a WiMax frequency band.

Also, the signal quality metrics may include at least one of a CQI, a RI, a PMI, a noise level, an interference level, a RSSI level, a spectral integrity, a data throughput rate, a BER, a SER, a BLER, a FER, a MSE, a signal-to-noise rating, a noise-plus-interference level, or a signal-to-noise-plus-interference rating. At least one of the signal quality metrics may be specific to a block of a frequency band of the one or more frequency bands, a channel of a frequency band of the one or more frequency bands, or a frequency band of the one or more frequency bands. Also, at least one of the signal quality metrics may be an average or medium of multiple signal quality metrics of the one or more frequency bands available to one of the wireless communication devices.

At 608, along with the signal quality metrics or in separate message(s), the radio access provider may receive indications of available channels of an unlicensed frequency band from the wireless communication devices.

At 610, the radio access provider may select blocks or channels from one or more of the frequency bands for a radio communication link for each of at least a subset of the wireless communication devices based at least in part on the service priorities. At 612, the selecting includes selecting block or channels from multiple ones of the frequency bands for the radio communication link for at least one of the subset of the wireless communication devices. At 614, the selecting comprises selecting blocks or channels for wireless communication devices of a first service priority before selecting blocks or channels for wireless communication devices of a second service priority. At 616, the selecting comprises, for wireless communication devices of a specific service priority, selecting blocks or channels in order from a wireless communication device with a weakest signal quality metric to a wireless communication device with a strongest signal quality metric. At 618, the selecting comprises selecting blocks or channels based at least in part on the signal quality metrics. At 620, the selecting comprises selecting blocks or channels for both downlink and uplink connections with the wireless communication devices. At 622, the selecting comprises selecting a channel from the available channels of the unlicensed frequency band for the uplink connection with one of the wireless communication devices. At 624, the selecting comprises coordinating the selecting of the blocks or channels with another radio access provider, each of the radio access provider and the other radio access provider selecting a part of the blocks or channels for a particular wireless communication device. At 626, the selecting comprises selecting the blocks or channels based at least in part on cross-correlation, a cost function, transmission scenarios, guaranteed bit rates, or power capacities available to the wireless communication devices.

At 628, the radio access provider may notify a wireless communication device of the subset of the wireless communication devices of the blocks or channels selected for that wireless communication device.

At 630, the radio access provider may check whether a transmission time interval has completed. If not, the radio access provider may repeat checking whether the transmission time interval has completed. If the transmission time interval has completed, the radio access provider may repeat the operations shown at 602-628.

FIG. 7 illustrates an example process for selecting blocks or channels from frequency bands for radio communication links with wireless communication devices based on cross-correlations of blocks, channels, or frequency bands. The example process includes, at 702, receiving, by a radio access provider, reference signals for multiple frequency bands or reference signals for the blocks or channels from the multiple frequency bands.

At 704, the radio access provider may calculate cross-correlation scores for pairs of the blocks, channels, or frequency bands using the reference signals. At 706, the calculating may include calculating cross-correlation scores between the two closest blocks from a pair of frequency bands or between the two largest separated blocks from the pair of frequency bands. At 708, the calculating may include calculating cross-correlation scores between a first block, channel, or frequency band accessed via a first radio antenna of the radio access provider with a corresponding second block, channel or frequency band accessed via a second radio antenna of the radio access provider.

At 710, the radio access provider may generate a lookup table of calculated cross-correlation scores and associated block, channel, or frequency band pairs.

At 712, the radio access provider may receive identifications of frequency bands available to a wireless communication device.

At 714, the radio access provider may either look up cross-correlation scores for pairs of the available frequency bands or pairs of blocks or channels from the available frequency bands in the lookup table or may calculate cross-correlation scores for pairs of the available frequency bands or pairs of blocks or channels from the available frequency bands.

At 716, the radio access provider may select blocks or channels from available frequency bands for a radio communication link for the wireless communication device based at least in part on the cross-correlation scores.

FIG. 8 illustrates an example process for determining, by a wireless communication device, available frequency bands based on associated power demands and on a power metric for the wireless communication device and informing a radio access provider of the available frequency bands. The example process includes, at 802, receiving, by a wireless communication device, signal quality metrics for blocks, channels or frequency bands.

At 804, the wireless communication device may further receive power demands associated with frequency bands.

At 806, the wireless communication device may determine, based on the signal quality metrics, a plurality of frequency bands that are available to the wireless communication device.

At 808, the wireless communication device may then determine a power demand for transmission via each available frequency band based on the received power demands.

At 810, the wireless communication device may determine a power metric indicative of power available to the wireless communication device.

At 812, the wireless communication device may select a subset of the available frequency bands based at least in part on the respective power demands and the power metric. At 814, the selecting comprises selecting different subsets of the available frequency bands over time based on changes to the power metric. At 816, the selecting comprises determining multiple alternative subsets of the available frequency bands.

At 818, the wireless communication device may inform a radio access provider of the selected subset of the available frequency bands. At 820, the informing may comprise informing the radio access provider of the multiple alternative subsets determined at 816.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims

What is claimed is:

1. A method implemented by a radio access provider that is configured to communicate with wireless communication devices over frequency bands, the method comprising:

receiving service priorities for the wireless communication devices, the service priorities being associated with active applications of the wireless communication devices;

receiving reference signals for at least one of the frequency bands, multiple blocks of the frequency bands, or multiple channels of the frequency bands;

determining, based at least in part on the reference signals, at least one cross-correlation score for at least one of a pair of the frequency bands, a pair of the multiple blocks of the frequency bands, or a pair of the multiple channels of the frequency bands;

generating a lookup table of the at least one cross-correlation score for the at least one of the pair of frequency bands, the pair of the multiple blocks of the frequency bands, or the pair of the multiple channels of the frequency bands;

receiving an identification of at least one frequency band that is available to a subset of the wireless communication devices; and selecting blocks or channels from one or more of the frequency bands based at least in part on a cross-correlation score of the at least one frequency band that is available to the subset of the wireless communication devices that is stored in the lookup table.

2. The method of claim 1, wherein the selecting comprises selecting blocks or channels for wireless communication devices of a first service priority before selecting blocks or channels for wireless communication devices of a second service priority.

3. The method of claim 1, wherein the selecting comprises, for wireless communication devices of a specific service priority, selecting blocks or channels in order from a wireless communication device with a weakest signal quality metric to a wireless communication device with a strongest signal quality metric.

4. The method of claim 1, further comprising receiving signal quality metrics for the wireless communication devices and performing the selecting based at least in part on the signal quality metrics.

5. The method of claim 1, wherein the selecting is performed for both of a downlink connection and an uplink connection with the wireless communication devices.

6. The method of claim 5, further comprising receiving indications of available channels of an unlicensed frequency band from the wireless communication devices, wherein the selecting comprises selecting a channel from the available channels of the unlicensed frequency band for the uplink connection with one of the wireless communication devices.

7. The method of claim 1, wherein the service priorities are quality-of-service class identifiers (QCI).

8. The method of claim 7, wherein the QCI for a specific application or QCIs for a specific user of at least one of the wireless communication devices are adjustable based on a service plan of the specific user or based on purchase of a higher QCI or QCIs.

9. The method of claim 1, wherein the active applications include at least one of Voice-over-Long-Term-Evolution (VoLTE) calling application, a voice calling application, a video calling application, a video chat application, a video streaming application, a messaging application, an email application, a social networking application, a gaming application, a web browser application, a real-time communication application, or any application that engages in communication with a remote device.

10. The method of claim 1, wherein the frequency bands include one or more of a licensed frequency band, an unlicensed frequency band, a semi-licensed frequency band, an overlapped frequency band, a cellular frequency band, an Advanced Wireless Services (AWS) frequency band, a 700 MHz frequency band, an 800 MHz frequency band, a 900 MHz frequency band, a Personal Communication Service (PCS) frequency band, an 1800 MHz frequency band, a 1900 MHz frequency band, a 4.9 GHz frequency band, a Global System for Mobile Communications (GSM) frequency band, a 2.4 GHz frequency band, a 5.0 GHz frequency band, a 5.8 GHz frequency band, a 3.65 GHz frequency band, an Ultra-Wide Band (UWB) frequency band, a frequency band in a range from 3.1-10.6 GHz, a 3G frequency band, a Wireless Communication Service (WCS) frequency band, a Multichannel Multipoint Distribution Service (MMDS) frequency band, or a WiMax frequency band.

11. The method of claim 1, wherein the selecting further comprises coordinating the selecting of the blocks or channels with another radio access provider, each of the radio access provider and the other radio access provider selecting a part of the blocks or channels for a particular wireless communication device.

12. The method of claim 1, further comprising repeating the receiving and the selecting for multiple transmission time intervals.

13. The method of claim 1, wherein the selecting further comprises selecting the blocks or channels based at least in part on a cost function, transmission scenarios, guaranteed bit rates, or power capacities available to the wireless communication devices.

14. The method of claim 1, further comprising notifying a wireless communication device of the subset of the wireless communication devices of the blocks or channels selected for that wireless communication device.

15. The method of claim 1, wherein selecting the blocks or channels from one or more of the frequency bands is further based on a determination that the cross-correlation score of the at least one frequency band is above a predefined threshold.

16. A radio access provider that is configured to communicate with wireless communication devices over frequency bands, comprising:
a processor;
one or more transceivers; and
programming instructions that, when operated by the processor, perform operations including:
receiving service priorities for the wireless communication devices, the service priorities being associated with active applications of the wireless communication devices;
receiving reference signals for at least one of the frequency bands, multiple blocks of the frequency bands, or multiple channels of the frequency bands;
determining, based at least in part on the reference signals, at least one cross-correlation score for at least one of a pair of the frequency bands, a pair of the multiple blocks of the frequency bands, or a pair of the multiple channels of the frequency bands;
generating a lookup table of the at least one cross-correlation score for the at least one of the pair of the frequency bands, the pair of the multiple blocks of the frequency bands, or the pair of the multiple channels of the frequency bands;
receiving an identification of at least one frequency band that is available to a subset of the wireless communication devices; and
selecting blocks or channels from one or more of the frequency bands based at least in part on a cross-correlation score of the at least one frequency band that is available to the subset of the wireless communication devices that is stored in the lookup table.

17. The radio access provider of claim 16, wherein selecting is performed for both downlink and uplink connections with the wireless communication devices.

18. The radio access provider of claim 16, wherein the service priorities are quality-of-service class identifiers (QCI).

19. The radio access provider of claim 18, wherein the QCI for a specific application or QCIs for a specific user of at least one of the wireless communication devices are adjustable based on a service plan of the specific user or based on purchase of a higher QCI or QCIs.

20. The radio access provider of claim 16, wherein the selecting further comprises coordinating the selecting of the blocks or channels with another radio access provider, each of the radio access provider and the other radio access provider selecting a part of the blocks or channels for a particular wireless communication device.

21. The radio access provider of claim 16, wherein the operations further include repeating the receiving and the selecting for multiple transmission time intervals.

22. The radio access provider of claim 16, wherein the operations further include notifying a wireless communication device of the subset of the wireless communication devices of the blocks or channels selected for that wireless communication device.

* * * * *